United States Patent
Ito

(10) Patent No.: US 12,313,903 B2
(45) Date of Patent: May 27, 2025

(54) LENS SUPPORT MECHANISM, AND LENS BARREL AND CAMERA PROVIDED WITH THE LENS SUPPORT MECHANISM

(71) Applicant: Panasonic Intellectual Property Management Co., Ltd., Osaka (JP)

(72) Inventor: Daisuke Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 774 days.

(21) Appl. No.: 17/343,226

(22) Filed: Jun. 9, 2021

(65) Prior Publication Data
US 2022/0066131 A1 Mar. 3, 2022

(30) Foreign Application Priority Data
Sep. 1, 2020 (JP) ................................. 2020-146807

(51) Int. Cl.
*G02B 7/10* (2021.01)
*G02B 7/02* (2021.01)

(52) U.S. Cl.
CPC .............. *G02B 7/10* (2013.01); *G02B 7/021* (2013.01)

(58) Field of Classification Search
CPC .......... G02B 7/102; G02B 7/105; G02B 7/10; G02B 15/20; G02B 15/22; G02B 7/021; G03B 5/00; G03B 5/02; G03B 5/04; G03B 5/06; G03B 5/08; G03B 17/14; G03B 3/10; G03B 2205/0046; G03B 2205/0053
See application file for complete search history.

(56) References Cited

U.S. PATENT DOCUMENTS

| 5,657,173 A | 8/1997 | Imanari et al. |
| 7,391,965 B2 | 6/2008 | Noguchi |

(Continued)

FOREIGN PATENT DOCUMENTS

| CN | 107817570 A | * | 3/2018 | ............... G02B 7/04 |
| JP | S6234112 A | | 2/1987 | |

(Continued)

OTHER PUBLICATIONS

Notice of Reasons for Refusal in corresponding application JP2021-039919 dated Apr. 2, 2024 with Machine Translation.

(Continued)

*Primary Examiner* — Ephrem Z Mebrahtu
(74) *Attorney, Agent, or Firm* — Renner, Otto, Boisselle & Sklar, LLP

(57) ABSTRACT

A lens support mechanism 10 comprises lens group units 23 to 27, a substantially cylindrical rectilinear cylinder 11, and a substantially cylindrical cam cylinder 12. The rectilinear cylinder 11 envelops the lens group units 23 to 27, and has main cam followers 11b protruding outward in the radial direction from the outer peripheral surface, and a sub cam groove 11c. The cam cylinder 12 has main cam grooves 12b and a sub cam follower 12c, and is disposed on the outer peripheral side of the rectilinear cylinder 11. The main cam grooves 12b engage with the main cam followers 11b and are formed substantially parallel to the sub cam groove 11c, and upon rotating relative to the rectilinear cylinder 11, move the lens group units 23 to 27 back and forth in the optical axis direction. The sub cam followers 12c project inward in the radial direction and engage with the sub cam grooves 11c.

9 Claims, 12 Drawing Sheets

(56) References Cited

U.S. PATENT DOCUMENTS

| | | |
|---|---|---|
| 7,773,313 B2 | 8/2010 | Ishizuka |
| 7,911,721 B2 | 3/2011 | Iwasa |
| 8,077,412 B2 | 12/2011 | Santo et al. |
| 9,715,081 B2 | 7/2017 | Shishido |
| 11,073,674 B2 | 7/2021 | Sasaki |
| 2005/0162752 A1 | 7/2005 | Hayashi et al. |
| 2006/0029378 A1* | 2/2006 | Noguchi ............ G02B 7/021 396/72 |
| 2009/0097141 A1 | 4/2009 | Iwasa |
| 2009/0195891 A1 | 8/2009 | Miya |
| 2010/0220402 A1 | 9/2010 | Santo et al. |
| 2011/0149420 A1* | 6/2011 | Fukino ............ G02B 7/023 359/823 |
| 2015/0168671 A1* | 6/2015 | Shishido ............ G02B 7/10 359/700 |
| 2016/0161704 A1 | 6/2016 | Shishido |
| 2019/0162926 A1 | 5/2019 | Sasaki |
| 2023/0152555 A1* | 5/2023 | Otsuka ............ G02B 7/023 359/676 |

FOREIGN PATENT DOCUMENTS

| | | |
|---|---|---|
| JP | 2001042189 A | 2/2001 |
| JP | 2006047723 A | 2/2006 |
| JP | 2009098378 A | 5/2009 |
| JP | 2009-186529 A | 8/2009 |
| JP | 2010224526 A | 10/2010 |
| JP | 2013-224973 A | 10/2013 |
| JP | 2013228515 A | 11/2013 |
| JP | 2014-48450 A | 3/2014 |
| JP | 2016109859 A | 6/2016 |
| JP | 2019095728 A | 6/2019 |
| WO | 2015087562 A1 | 6/2015 |

OTHER PUBLICATIONS

Notice of Reasons for Refusal in corresponding application JP2021-051505 dated Apr. 2, 2024 with Machine Translation.

Non-Final Office Action issued Jun. 6, 2024, for co-pending U.S. Appl. No. 17/403,253.

* cited by examiner

Wide

Tele

Wide

Tele

LENS SUPPORT MECHANISM, AND LENS BARREL AND CAMERA PROVIDED WITH THE LENS SUPPORT MECHANISM

CROSS-REFERENCE TO RELATED APPLICATIONS

This application claims priority to Japanese Patent Application No. 2020-146807 filed on Sep. 1, 2020. The entire disclosure of Japanese Patent Application No. 2020-146807 is hereby incorporated herein by reference.

BACKGROUND

Technical Field

The present disclosure relates to a lens support mechanism included in a lens barrel mounted on a camera body, as well as a lens barrel and a camera provided with this lens support mechanism.

Description of the Related Art

The lens barrel mounted on the camera body comprises a plurality of frame bodies that support an optical system. The first frame body included in the plurality of frame bodies has a cam member, and the second frame body has a guide groove in which the cam member is inserted and slides.

When the first and second frames rotate relative to each other, the cam member is guided by the guide groove, and the two frames move relative to each other in the optical axis direction, the result being a retractable lens barrel.

However, if an external force should act on the lens barrel, the force may be transmitted to the frame body and damage the cam member and the guide groove.

In view of this, in addition to the cam member and the guide groove, the frame bodies are each provided with a reinforcing protrusion and a reinforcing groove. Even if an external force acts on the lens barrel, the reinforcing protrusion and the reinforcing groove can also receive the force, and this minimizes the damage to the cam member and the guide groove.

However, it is necessary to increase the diameter of the frame body or make the guide groove smaller by providing a reinforcing groove in the frame body in addition to the guide groove. That is, the reinforcing groove may reduce the latitude of design.

For example, Patent Literature 1 discloses a lens barrel comprising a first frame having five grooves disposed spaced apart in the circumferential direction, and a second frame having five protrusions that are respectively inserted into these five grooves, in order to improve strength and afford greater latitude in design.

CITATION LIST

Patent Literature

Patent Literature 1: JP-A 2013-224973
Patent Literature 2: JP-A 2014-48450
Patent Literature 3: JP-A 2009-186529

SUMMARY

Problem to be Solved by the Invention

However, the conventional lens barrels described above have the following problems.

With the lens barrels disclosed in the above publications, all five protrusions, including three cam followers and two protrusions for improving strength, are provided to the same second frame, and similarly, the five grooves into which these five protrusions are inserted are all provided to the same first frame. Therefore, this can reduce the latitude of design of the lens barrel.

It is an object of the present disclosure to provide a lens support mechanism that affords greater latitude in design, as well as a lens barrel and a camera provided with this mechanism.

Means for Solving Problem

The lens support mechanism according to the present disclosure comprises a lens group, a substantially cylindrical fixed cylinder, and a substantially cylindrical cam cylinder. The substantially cylindrical fixed cylinder envelops the lens group and has a first cam follower protruding radially outward from the outer peripheral surface, and a second cam groove. The substantially cylindrical cam cylinder has a first cam groove and a second cam follower, and is disposed on the outer peripheral side of the fixed cylinder. The first cam groove engages with the first cam follower, moves the lens group back and forth in the optical axis direction when rotated relative to the fixed cylinder, and is formed substantially parallel to the second cam groove. The second cam follower protrudes inward in the radial direction and engages with the second cam groove.

Effects

The lens support mechanism according to the present disclosure affords greater latitude in design than in the past.

DETAILED DESCRIPTION OF THE EMBODIMENT

Embodiments will now be described in detail with reference to the drawings where needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 100 including a lens support mechanism 10 according to an embodiment of the present disclosure will now be described with reference to FIGS. 1 to 12B.

(1) Configuration of Lens Barrel 100

Figure 1:
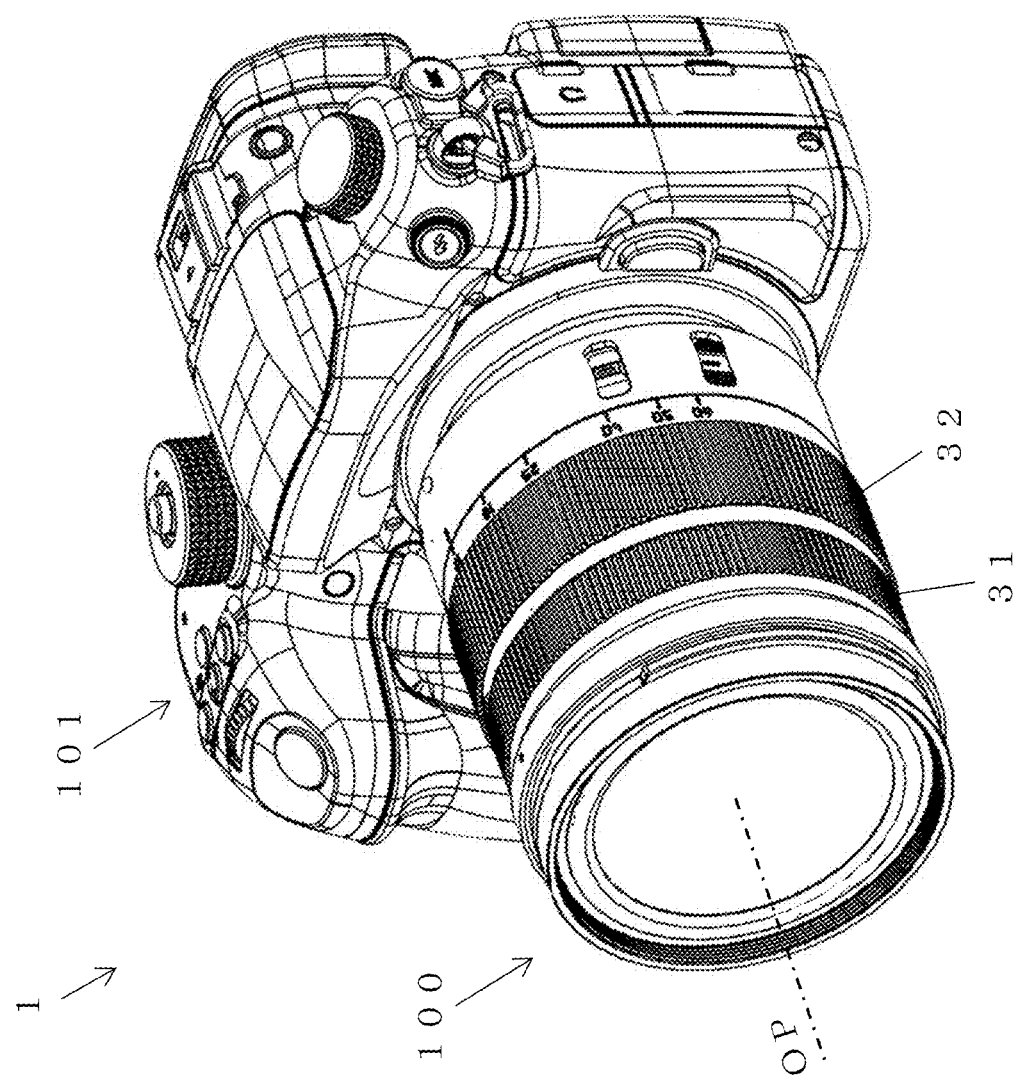
FIG. 1 is an overall oblique view showing the configuration of a camera in which a lens barrel including the lens support mechanism according to an embodiment of the present disclosure is attached to a camera body.

The configuration of the lens barrel 100 including the lens support mechanism 10 according to an embodiment of the present disclosure will now be described with reference to the drawings. FIG. 1 is an oblique view showing the configuration of a camera 1 in which the lens barrel 100 including the lens support mechanism 10 according to this embodiment is attached to a camera body 101.

As shown in FIG. 1, the lens barrel 100 is a retractable lens barrel that is detachably attached to the camera body 101.

Figure 2:
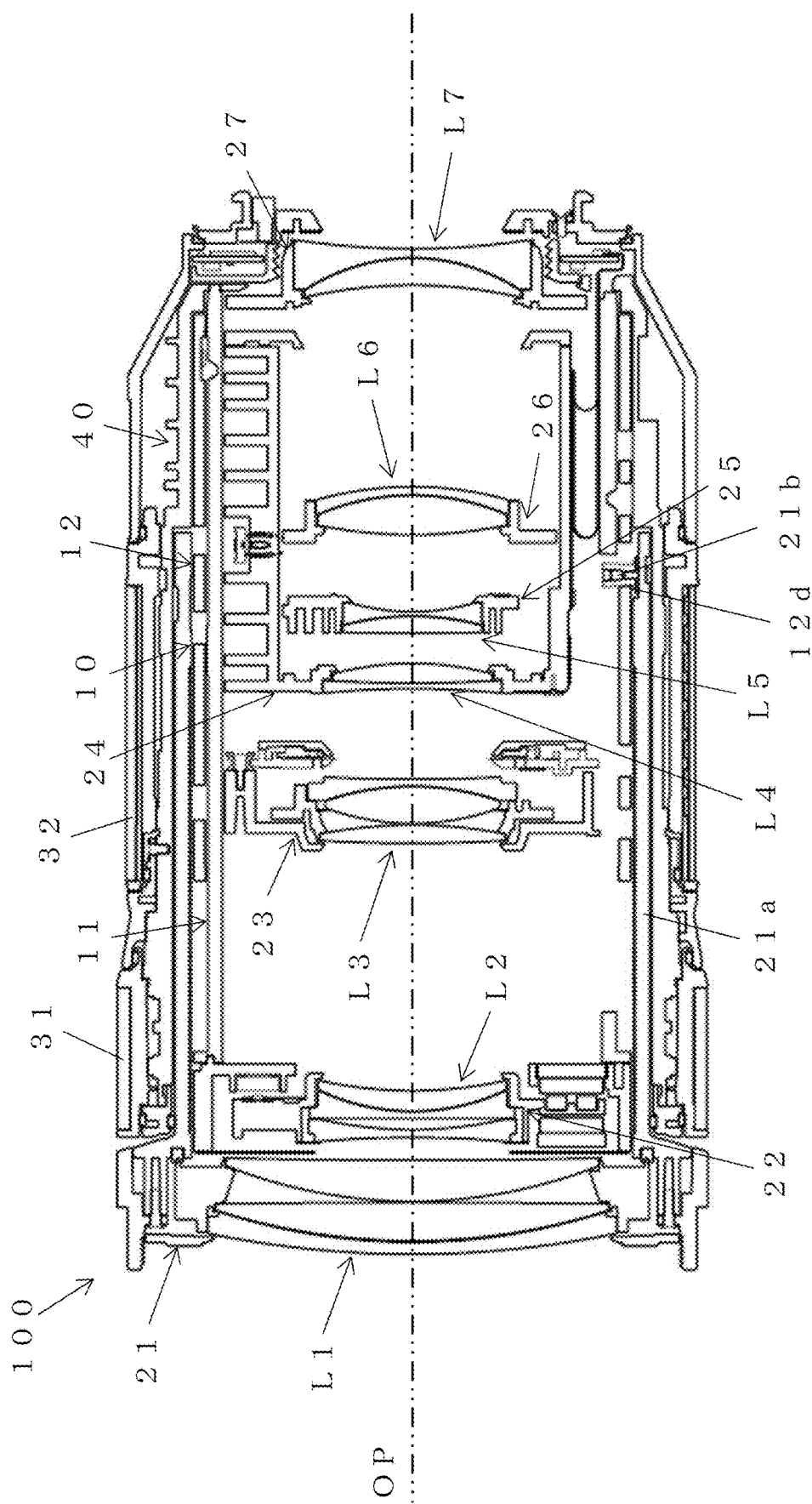
FIG. 2 is a cross-sectional view of the lens barrel in FIG. 1.
Figure 3A:
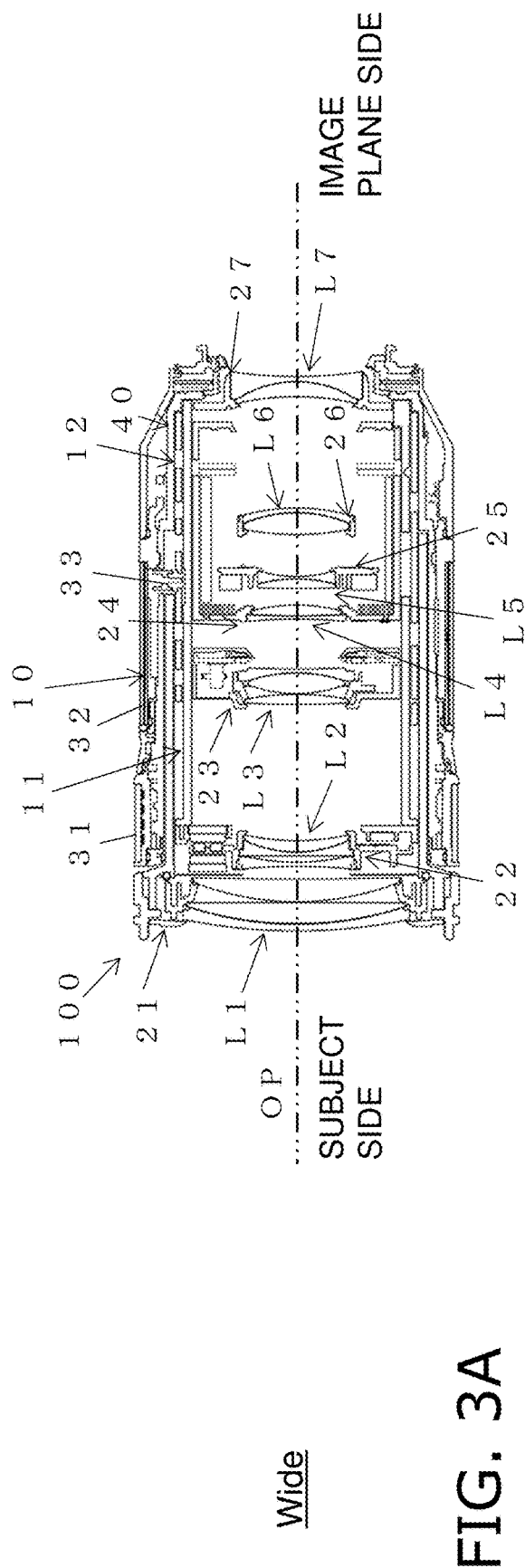
FIG. 3A is a cross-sectional view showing a state in which the lens barrel in FIG. 2 is in the wide-angle position.
Figure 3B:
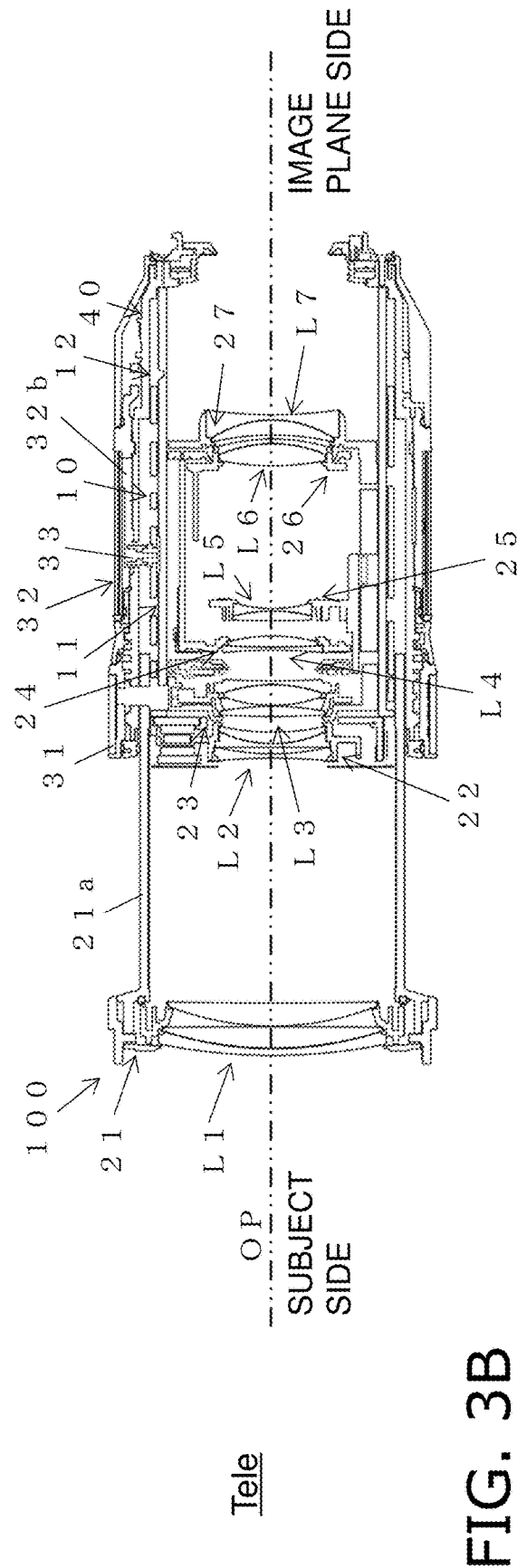
FIG. 3B is a cross-sectional view showing a state in which the lens barrel in FIG. 2 is in the telephoto position.

As shown in FIG. 2, the lens barrel 100 mainly comprises a rectilinear cylinder (fixed cylinder) 11, a cam cylinder 12, a first lens group unit (lens group unit) 21, a second lens group unit (lens group unit) 22, a third lens group unit (lens group unit) 23, a fourth lens group unit (lens group unit) 24, a fifth lens group unit (lens group unit) 25, a sixth lens group unit (lens group unit) 26, a seventh lens group unit (lens group unit) 27, a focus ring 31, a zoom ring 32, and a base frame 40.

The lens barrel 100 also comprises a lens support mechanism 10 including the rectilinear cylinder 11 and the cam cylinder 12. The detailed configuration of the lens support mechanism 10 will be described in detail below.

The first lens group unit 21 is a substantially cylindrical member disposed on the outer peripheral surface side of the rectilinear cylinder 11, and holds a first lens group lens L1 at the end on the subject side in the optical axis OP direction, as shown in FIG. 2. The first lens group unit 21 is disposed closest to the subject side in the optical axis OP direction of the lens barrel 100.

As shown in FIG. 2, the first lens group unit 21 has a substantially cylindrical main body portion 21a and a cam follower 21b provided on the inner peripheral surface of the substantially cylindrical main body portion 21a.

The cam follower 21b of the first lens group unit 21 is provided so as to project radially inward from the outer peripheral surface near the end on the subject side of the inner peripheral surface of the substantially cylindrical main body portion 21a. The cam follower 21b is engaged with a rectilinear groove 11d (see FIG. 5) formed in the rectilinear cylinder 11, and with a cam groove 12d (see FIG. 6A) formed in the cam cylinder 12, and the first lens group unit 21 is moved back and forth in the optical axis OP direction as the cam cylinder 12 rotates.

The second lens group unit 22 is a substantially annular member included on the inner peripheral surface side of the rectilinear cylinder 11, and holds a second lens group lens L2 as shown in FIG. 2. The second lens group unit 22 is disposed between the first lens group unit 21 and the third lens group unit 23 in the optical axis OP direction of the lens barrel 100. The second lens group unit 22 is fixed to the end surface on the subject side of the rectilinear cylinder 11 with a screw (not shown).

The third lens group unit 23 is a substantially annular member included on the inner peripheral surface side of the rectilinear cylinder 11, and holds a third lens group lens L3 as shown in FIG. 2. The third lens group unit 23 is disposed between the second lens group unit 22 and the fourth lens group unit 24 in the optical axis OP direction of the lens barrel 100.

The third lens group unit 23 has a cam follower 23a (see FIG. 4A) provided so as to project radially outward from the outer peripheral surface.

The fourth lens group unit 24 is a substantially cylindrical member included on the inner peripheral surface side of the rectilinear cylinder 11, and holds a fourth lens group lens L4 as shown in FIG. 2. The fourth lens group unit 24 is disposed between the third lens group unit 23 and the fifth lens group unit 25 in the optical axis OP direction of the lens barrel 100.

The fourth lens group unit 24 has a cam follower 24a (see FIG. 4A) provided so as to project radially outward from the outer peripheral surface.

The fifth lens group unit 25 is a substantially annular member included on the inner peripheral surface side of the rectilinear cylinder 11, and holds a fifth lens group lens L5 as shown in FIG. 2. The fifth lens group unit 25 is disposed between the fourth lens group unit 24 and the sixth lens group unit 26 in the optical axis OP direction of the lens barrel 100. The fifth lens group unit 25 is attached in a state of being suspended from the fourth lens group unit 24 by a guide shaft 28 (see FIG. 7) that is attached at one end to the fourth lens group unit 24.

The sixth lens group unit 26 is a substantially annular member included on the inner peripheral surface side of the rectilinear cylinder 11, and holds a sixth lens group lens L6 as shown in FIG. 2. The sixth lens group unit 26 is disposed between the fifth lens group unit 25 and the seventh lens group unit 27 in the optical axis OP direction of the lens barrel 100. Like the fifth lens group unit 25, the sixth lens group unit 26 is attached in a state of being suspended from the fourth lens group unit 24 by a guide shaft (not shown).

The seventh lens group unit 27 is a substantially annular member included on the inner peripheral surface side of the rectilinear cylinder 11, and holds a seventh lens group lens L7 as shown in FIG. 2. The seventh lens group unit 27 is disposed closest to the image plane side (the opposite side from the subject side) in the optical axis OP direction of the lens barrel 100.

The seventh lens group unit 27 has a cam follower 27*a* (see FIG. 4A) provided so as to project radially outward from the outer peripheral surface.

Here, the first to seventh lens group lenses L1 to L7 held by the first to seventh lens group units 21 to 27 are disposed in that order, starting from the subject side, with the optical axis OP as their central axis. In the lens barrel 100, the rotational operation of a zoom ring 32 (discussed below) moves the first and third to seventh lens group units 21 and 23 to 27 back and forth in the optical axis OP direction between the wide-angle position shown in FIG. 3A and the telephoto position shown in FIG. 3B.

That is, the lens barrel 100 is configured such that when the zoom ring 32 rotatably attached to the outer peripheral surface of the base frame 40 is rotated, the cam cylinder 12 rotates along with the rotation of the zoom ring 32. In the lens barrel 100, when the cam barrel 12 rotates, the first and third to seventh lens group units 21 and 23 to 27 are driven back and forth in the optical axis OP direction.

Figure 4A:
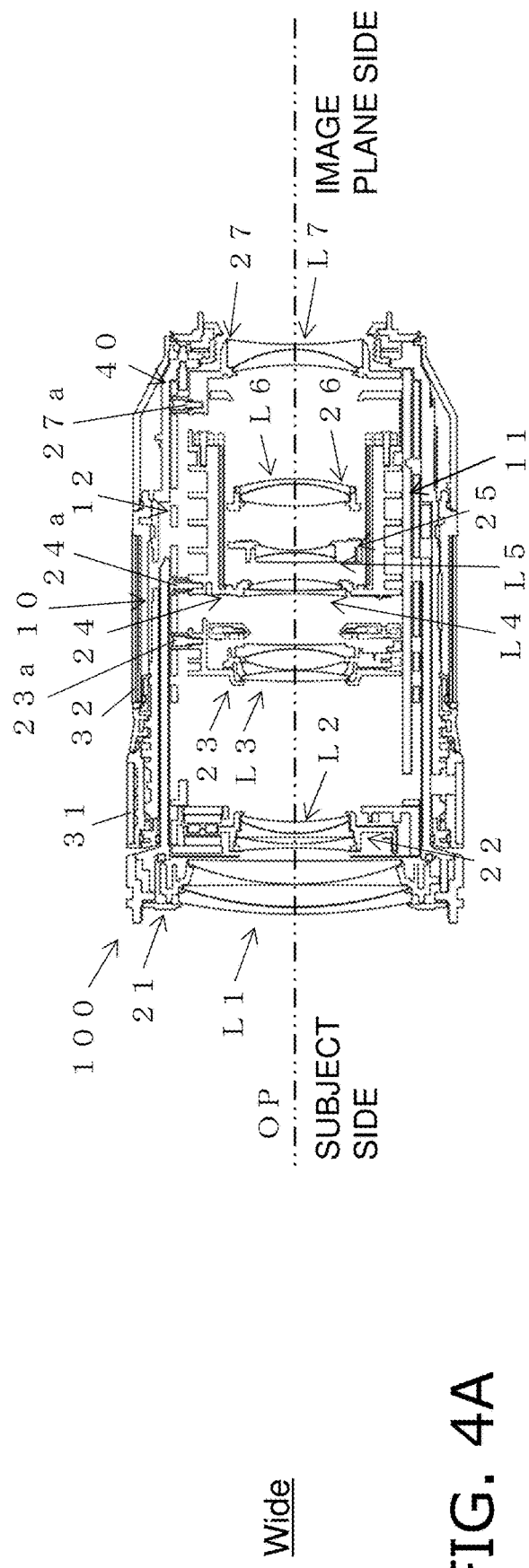
FIG. 4A is a cross-sectional view showing a state in which the cam followers of third, fourth, and seventh lens group units are engaged with the cam groove of the cam cylinder at the wide-angle position in FIG. 3A.

As shown in FIG. 4A, the first, third, fourth, and seventh lens group units 21, 23, 24, and 27 have a plurality of cam followers (cam followers 21*b*, 23*a*, 24*a*, and 27*a*) that respectively engage with a plurality of cam grooves formed in the cam cylinder 12. Also, the cam follower 21*b* of the first lens group unit 21 engages with the rectilinear groove 11*d* formed in the rectilinear cylinder 11. Also, the cam followers 23*a*, 24*a*, and 27*a* of the third, fourth, and seventh lens group units 23, 24, and 27 engage with the rectilinear groove 11*e* formed in the rectilinear cylinder 11.

Furthermore, the cam follower 21*b* of the first lens group unit 21 engages with the cam groove 12*d* formed in the cam cylinder 12. Also, the cam followers 23*a*, 24*a*, and 27*a* of the third, fourth, and seventh lens group units 23, 24, and 27 engage with cam grooves 12*e*, 12*f*, and 12*g* formed in the cam cylinder 12.

Figure 4B:
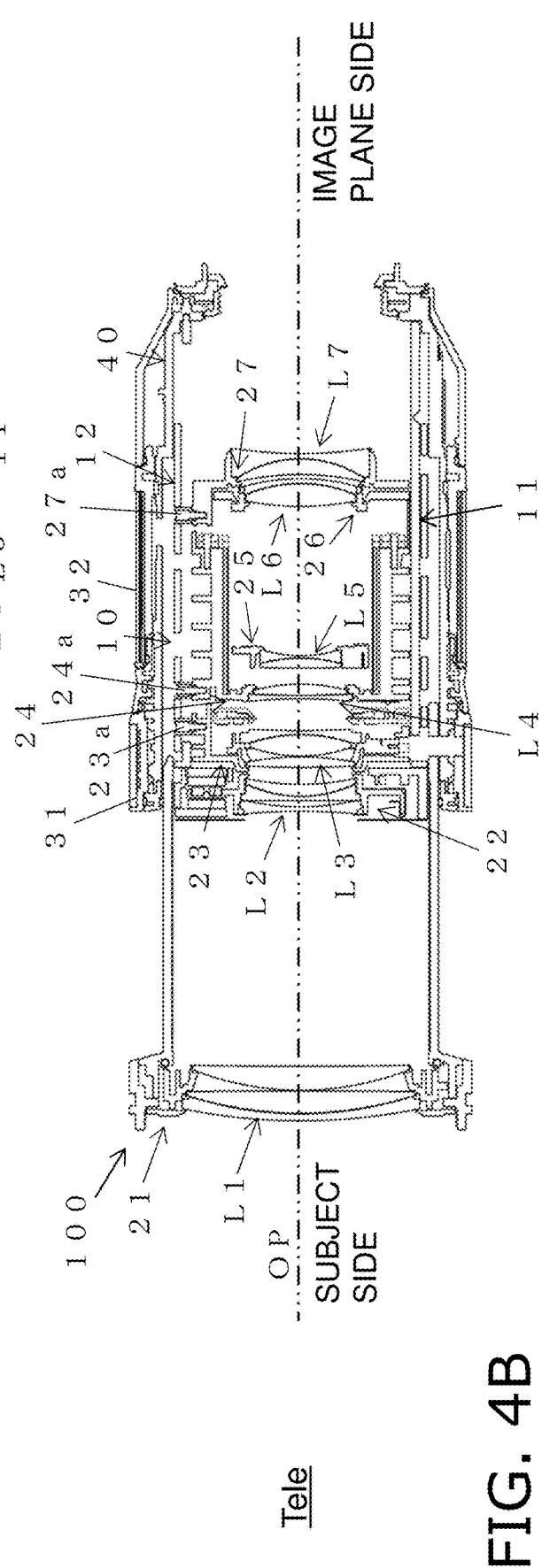
FIG. 4B is a cross-sectional view showing a state in which the cam followers of the third, fourth, and seventh lens group units are engaged with the cam groove of the cam cylinder at the telephoto position in FIG. 3B.

Consequently, when the cam cylinder 12 is rotated with respect to the rectilinear cylinder 11, the first, third, fourth, and seventh lens group units 21, 23, 24, and 27 driven back and forth relatively in the optical axis OP direction between the wide-angle position shown in FIG. 4A and the telephoto position shown in FIG. 4B.

(2) Configuration of Lens Support Mechanism 10

Next, the configuration of the lens support mechanism 10 in this embodiment will be described in detail.

As shown in FIG. 2, etc., the lens support mechanism 10 comprises the rectilinear cylinder 11 and the cam cylinder 12.

Figure 5:
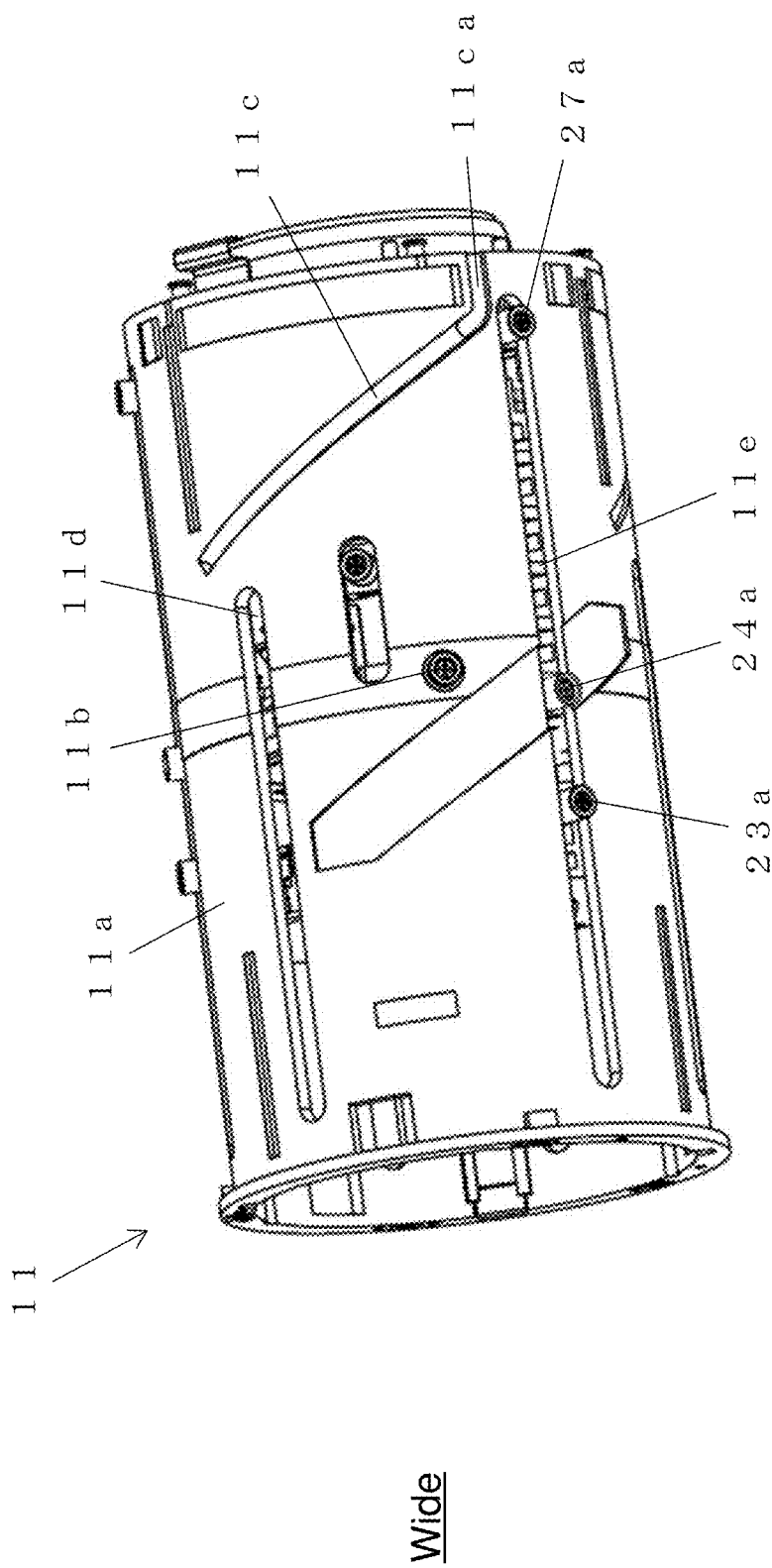
FIG. 5 is an oblique view showing a state in which the cam followers of the lens group units disposed on the inner peripheral surface side of the rectilinear cylinder of the lens support mechanism included in the lens barrel in FIG. 2 are engaged with a groove in the rectilinear cylinder.

As shown in FIG. 5, the rectilinear cylinder 11 has the substantially cylindrical main body portion 11*a*, the main cam followers (first cam followers) 11*b*, the sub cam groove (second cam groove) 11*c*, and the rectilinear grooves 11*d* and 11*e*. FIG. 5 shows the positions of the cam followers 23*a*, 24*a*, and 27*a* at the wide-angle position shown in FIG. 3A, etc.

As shown in FIG. 5, in the substantially cylindrical main body portion 11*a* are formed the rectilinear groove 11*d* in which the cam follower 21*b* provided to the first lens group unit 21 is engaged, and the rectilinear groove 11*e* in which the cam followers 23*a*, 24*a*, and 27*a* provided to the third, fourth, and seventh lens group units 23, 24, and 27 are engaged. Three main cam followers 11*b* are attached along the circumferential direction near the approximate center of the outer peripheral surface of the main body portion 11*a*.

As shown in FIG. 5, the three main cam followers (first cam followers) 11*b* are attached so as to project from the outer peripheral surface of the substantially cylindrical main body portion 11*a*.

In FIG. 5, the main cam followers 11*b* are directly attached to the outer peripheral surface of the rectilinear cylinder 11 for the sake of simplicity, but in the actual assembly process of the lens barrel 100, the main cam followers 11*b* are attached to the outer peripheral surface of the rectilinear cylinder 11 in a state in which the cam cylinder 12 has been inserted on the outer peripheral surface side of the rectilinear cylinder 11.

Figure 6A:
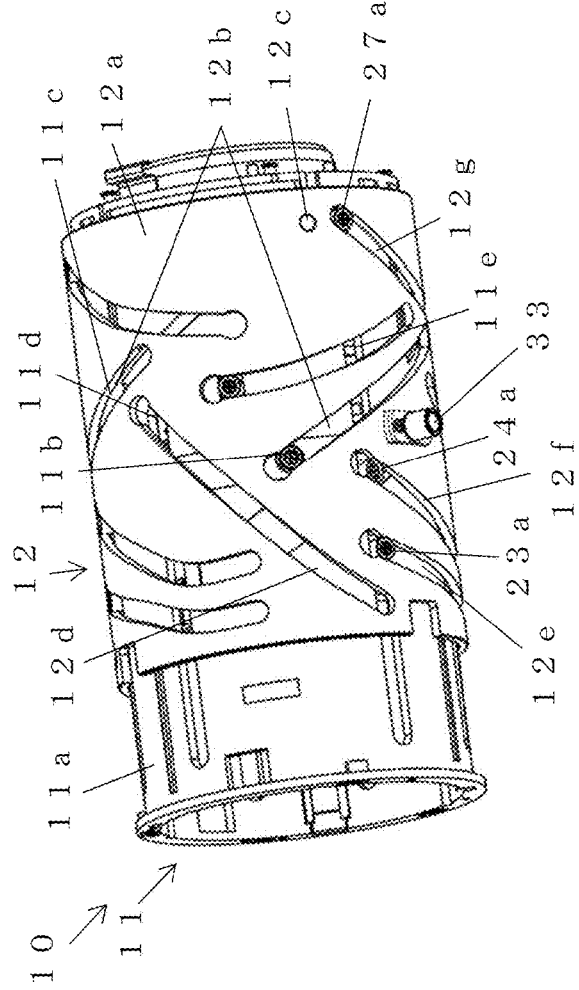
FIG. 6A is an oblique view showing the positional relationship between the rectilinear cylinder in FIG. 5, the cam cylinder disposed on the outer peripheral surface side thereof, and the cam followers of the lens group units at the wide-angle position.
Figure 6B:
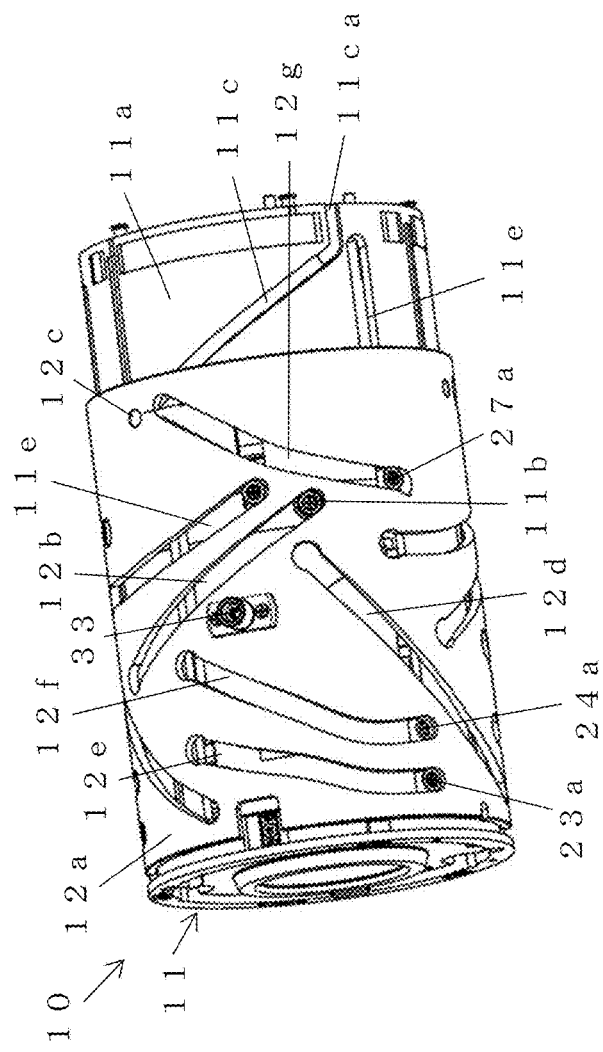
FIG. 6B is an oblique view showing the positional relationship between the rectilinear cylinder in FIG. 5, the cam cylinder disposed on the outer peripheral surface side thereof, and the cam followers of the lens group units at the telephoto position.

As shown in FIGS. 6A and 6B, the main cam followers 11*b* engage with the main cam grooves (first cam grooves) 12*b* formed on the cam cylinder 12 side, and move along the main cam grooves 12*b* as the cam cylinder 12 rotates.

As shown in FIG. 5, the sub cam groove (second cam groove) 11*c* is a recess (non-through hole) formed obliquely with respect to the optical axis OP direction, and engages with a sub cam follower 12*c*, which is provided so as to project inward in the radial direction from the inner peripheral surface of the cam cylinder 12, with specific gaps G1, G2, and G3 (see FIG. 8) therebetween. As shown in FIGS. 6A and 6B, the sub cam groove 11*c* is formed so as to be substantially parallel to the main cam grooves 12*b* provided on the cam cylinder 12 side (discussed below).

Figure 8:
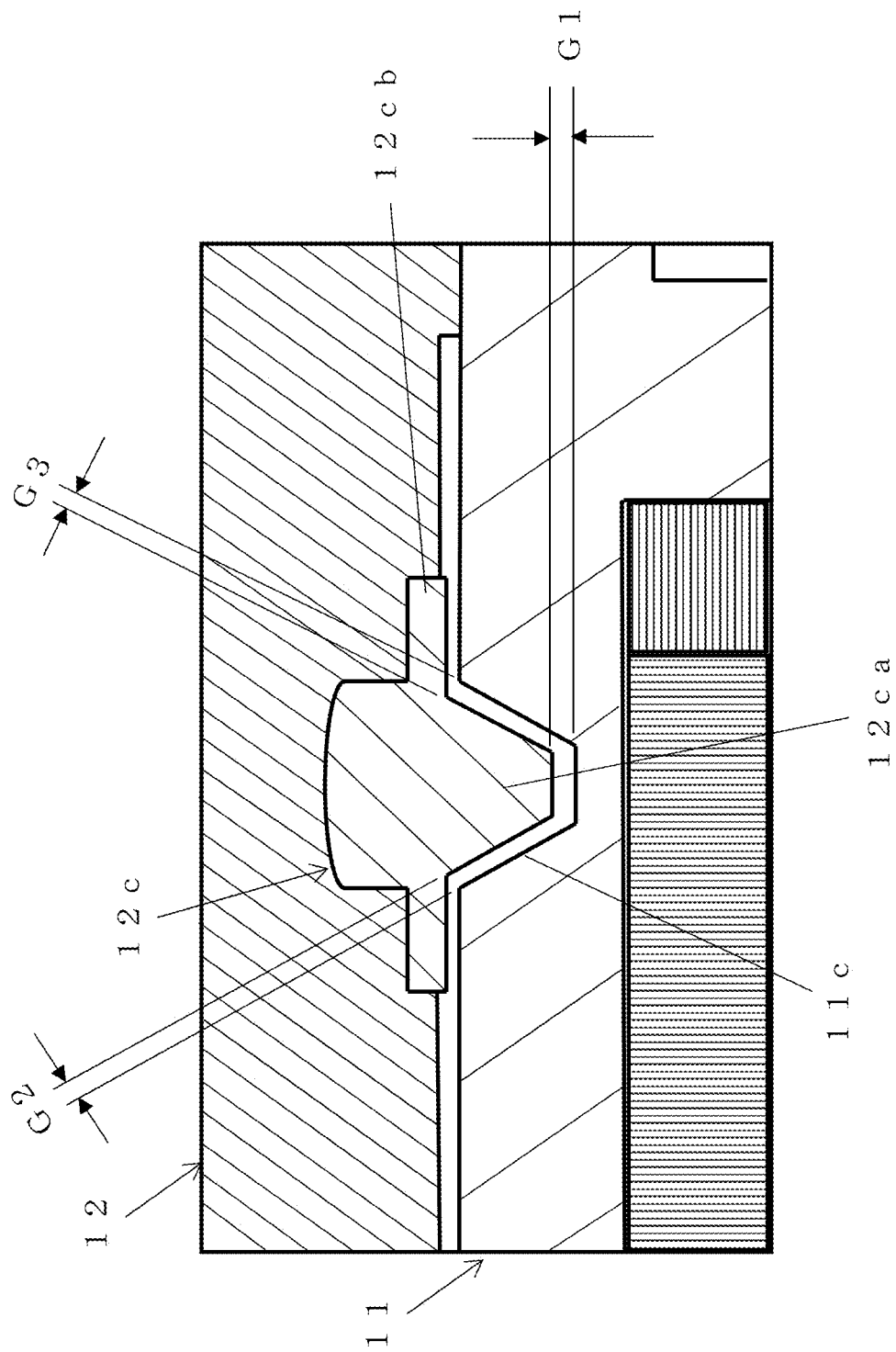
FIG. 8 is a detail cross-sectional view of the X portion in FIG. 7.

The specific gaps G1 to G3 shown in FIG. 8 have a size of about 0.1 to 0.2 mm, for example.

Consequently, as shown in FIGS. 6A and 6B, when the cam cylinder 12 is rotated with respect to the rectilinear cylinder 11, the sub cam follower 12*c* moves along the sub cam grooves 11*c* in a non-contact state, just as when the main cam followers 11*b* move along the main cam groove 12*b*. Therefore, when the sub cam follower 12*c* engages with the sub cam groove 11*c*, the rotation of the cam cylinder 12 with respect to the rectilinear cylinder 11 and its movement in the optical axis OP direction are not restricted by frictional force between the sub cam follower 12*c* and the sub cam groove 12*b*.

Also, the sub cam groove 11*c* is formed as a recess that does not pass through, as mentioned above.

This avoids a decrease in the rigidity of the rectilinear cylinder 11 due to the formation of the sub cam groove 11*c*.

Also, the sub cam groove 11*c* is provided with an insertion opening 11*ca* on the end surface on the image plane side.

Consequently, during assembly of the lens barrel 100, the cam cylinder 12 can be inserted from the end surface on the image plane side of the rectilinear cylinder 11, and the sub cam follower 12*c* can be engaged with the sub cam groove 11*c*, while the sub cam follower 12*c* is still attached to the inner peripheral surface side of the cam cylinder 12.

The rectilinear groove 11*d* is a through-hole through which the first lens group unit 21 is moved in the optical axis OP direction, and is formed in a straight line along the optical axis OP direction at a position closer to the subject side in the optical axis OP direction, as shown in FIG. 5.

The rectilinear groove 11e is a through-hole through which the third, fourth, and seventh lens group units 23, 24, and 27 are moved in the optical axis OP direction, and as shown in FIG. 5, the cam followers 23a 24a, and 27a of the units 23, 24, and 27 are engaged therein. The rectilinear groove 11e is formed in a straight line along the optical axis OP direction over substantially the entire length of the substantially cylindrical main body portion 11a in the optical axis OP direction.

As shown in FIGS. 6A and 6B, the cam cylinder 12 is disposed on the outer peripheral surface side of the substantially cylindrical rectilinear cylinder 11 described above, and has a substantially cylindrical main body portion 12a, main cam grooves (first cam grooves) 12b, a sub cam follower (second cam follower) 12c, and cam grooves 12d, 12e, 12f, and 12g.

With the lens barrel 100 in this embodiment, the rectilinear cylinder 11 and the cam cylinder 12 are inserted into the inner peripheral surface side of the base frame 40, and the rectilinear cylinder 11 is fixed to the base frame 40 with a screw (not shown).

Consequently, as shown in FIGS. 6A and 6B, the cam cylinder 12 moves back and forth in the optical axis OP direction on the outer peripheral surface side of the rectilinear cylinder 11, which is fixed with respect to the base frame 40.

As shown in FIG. 6A, the substantially cylindrical main body portion 12a is formed to have a plurality of cam grooves including the main cam grooves 12b and the cam grooves 12d, 12e, 12f, and 12g.

As shown in FIGS. 6A and 6B, three of the main cam grooves (first cam grooves) 12b are provided near the approximate center of the substantially cylindrical main body portion 12a so as to correspond to the three main cam followers 11b provided on the rectilinear cylinder 11 side as mentioned above. The three main cam grooves 12b are provided as substantially linear through-holes formed obliquely with respect to the optical axis OP direction.

The main cam grooves 12b do not need to be substantially rectilinear, and may instead be formed as a free curve.

Consequently, when the cam cylinder 12 is rotated with respect to the rectilinear cylinder 11, the cam cylinder 12 moves back and forth in the optical axis OP direction because of the movement of the main cam followers 11b provided on the rectilinear cylinder 11 side along the main cam grooves 12b.

Also, as shown in FIG. 6A, the main cam grooves 12b are disposed at a position overlapping a part of the sub cam groove 11c when viewed from the outer peripheral surface side.

This layout would not be feasible in a configuration in which the main cam grooves 12b and the sub cam groove 11c are provided to the same part. Therefore, compared to a conventional configuration in which the main cam grooves 12b and the sub cam groove 11c are provided to the same frame, there is greater latitude in design, and a compact, high-performance lens barrel 100 can be obtained.

Figure 7:
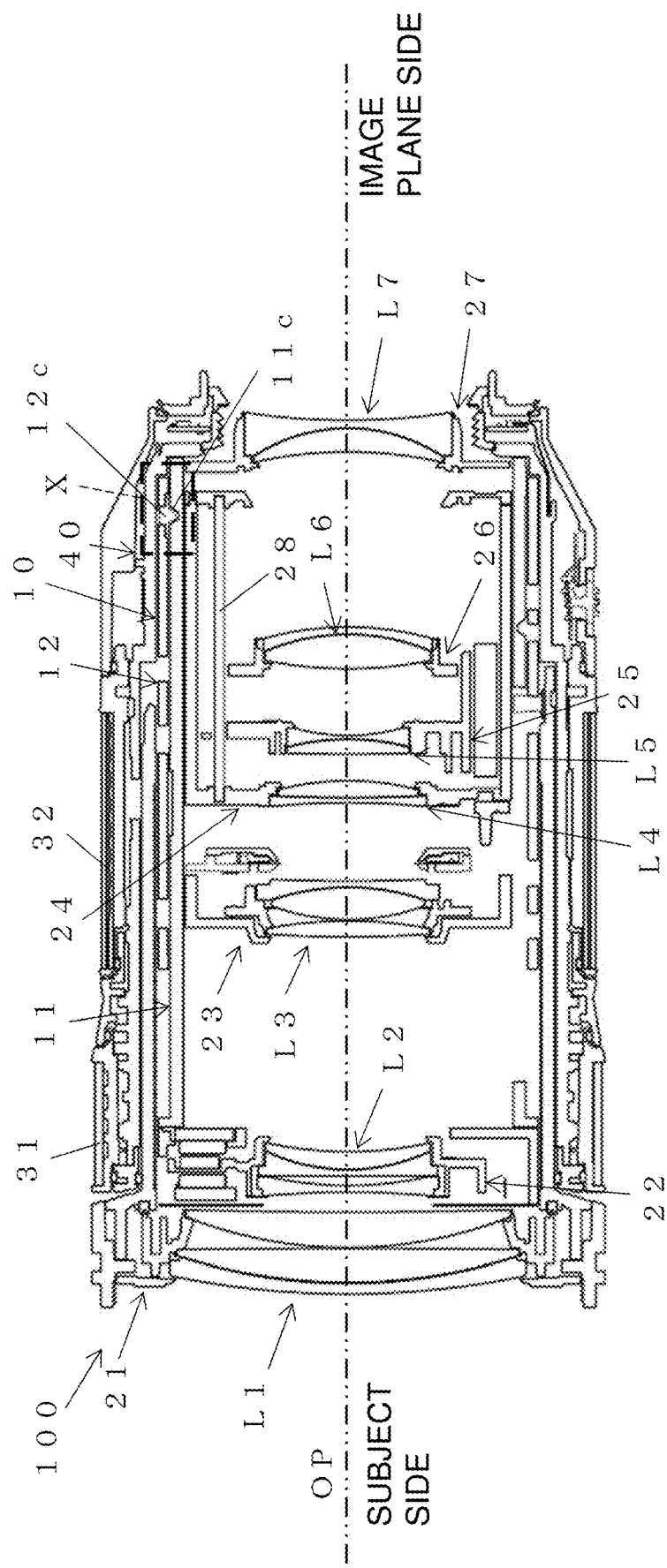
FIG. 7 is a cross-sectional view showing a state in which a sub cam follower provided to the cam cylinder is engaged with a sub cam groove provided to the rectilinear cylinder with a specific gap between them.

As shown in FIG. 7, the sub cam follower (second cam follower) 12c is provided so as to project radially inward from the inner peripheral surface of the cam cylinder 12. As shown in FIG. 8, the sub cam follower 12c is engaged with the sub cam groove 11c provided on the rectilinear cylinder 11 side (discussed above) with the specific gap G1 therebetween.

That is, as shown in FIG. 8, the sub cam follower 12c and the sub cam groove 11c are engaged with each other, with the specific gap G1 therebetween, in a steady state.

Here, in an abnormal situation in which an external force is applied from the outside, such as when the device is dropped, if the various components constituting the lens barrel 100 are deformed, the sub cam follower 12c and the sub cam groove 11c, which are not in contact with each other during a steady state, will come into contact.

This reduces deformation of the components constituting the lens barrel 100 and effectively prevents damage, distortion, and so forth to the components.

Also, as shown in FIG. 8, the sub cam follower 12c has a substantially conical main body portion 12ca and a flange portion 12cb protruding radially outward from the substantially conical outer peripheral surface.

As shown in FIG. 8, the main body portion 12ca is formed in a substantially conical shape to match the groove shape of the sub cam groove 11c. Consequently, the sub cam follower 12c can be engaged with the sub cam groove 11c in a state of non-contact with the surface of the sub cam groove 11c.

As shown in FIG. 8, the flange portion 12cb is a substantially annular portion provided on the base side of the substantially conical main body portion 12ca, and is disposed substantially parallel to the outer peripheral surface of the rectilinear cylinder 11 in a cross-sectional view along the optical axis OP. The flange portion 12cb is attached so as to be embedded in the inner peripheral surface of the cam cylinder 12.

Consequently, the strength of the sub cam follower 12c that comes into contact with the sub cam groove 11c can be increased when an external force is exerted on the lens barrel 100. Also, the flange portion 12cb can disperse the force applied to the sub cam follower 12c when an impact is applied. Furthermore, from the viewpoint of workability, when the sub cam follower 12c is fitted into the through-hole, the sub cam follower 12c can be prevented from coming off to the outside by the flange portion 12cb.

In this embodiment, the sub cam follower 12c is formed separately from the cam cylinder 12, and then attached so as to be embedded in the inner peripheral surface of the cam cylinder 12, but the sub cam follower 12c may instead be formed integrally with the cam cylinder 12.

As shown in FIGS. 6A and 6B, the cam groove 12d is a through-hole formed in the cam cylinder 12 at a position from the end on the subject side to near the approximate center, along a direction intersecting the optical axis OP direction, and as shown in FIG. 2, engages with the cam followers 21b of the first lens group unit 21. In the cam groove 12d, the cam followers 21b of the first lens group unit 21 are located at the right end (image plane side) at the wide-angle position shown in FIG. 6A, and the cam followers 21b of the first lens group unit 21 are located at the left end (subject side) at the telephoto position shown in FIG. 6B.

Consequently, when the cam cylinder 12 is rotated with respect to the rectilinear cylinder 11, the cam follower 21b of the first lens group unit 21 moves along the cam groove 12d of the cam cylinder 12 while engaging with the rectilinear groove 11d of the rectilinear cylinder 11, which allows the first lens group unit 21 to be moved back and forth in the optical axis OP direction.

As shown in FIGS. 6A and 6B, the cam groove 12e is a through-hole formed near the end on the subject side of the cam cylinder 12 along a direction intersecting the optical axis OP direction, and the cam follower 23a of the third lens group unit 23 is engaged in this groove. In the cam groove 12e, the cam follower 23a of the third lens group unit 23 is located at the right end (the image plane side) at the wide-angle position shown in FIG. 6A, and the cam follower 23a of the third lens group unit 23 is located at the left end (the subject side) at the telephoto position shown in FIG. 6B.

Consequently, when the cam cylinder 12 is rotated with respect to the rectilinear cylinder 11, the cam follower 23a of the third lens group unit 23 moves along the cam groove 12e while engaging with the rectilinear groove 11e of the rectilinear cylinder 11, which allows the third lens group unit 23 to be moved back and forth in the optical axis OP direction.

As shown in FIGS. 6A and 6B, the cam groove 12f is a through-hole formed along a direction intersecting the optical axis OP direction, at a position adjacent to the cam groove 12e formed near the end on the subject side of the cam cylinder 12, and the cam follower 24a of the fourth lens group unit 24 is engaged with this groove. In the cam groove 12f, the cam follower 24a of the fourth lens group unit 24 is located at the right end (the image plane side) at the wide-angle position shown in FIG. 6A, and the cam follower 24a of the fourth lens group unit 24 is located at the left end (the subject side) at the telephoto position shown in FIG. 6B.

Consequently, when the cam cylinder 12 is rotated with respect to the rectilinear cylinder 11, the cam follower 24a of the fourth lens group unit 24 moves along the cam groove 12f while engaging with the rectilinear groove 11e of the rectilinear cylinder 11, which allows the fourth lens group unit 24 to be moved back and forth in the optical axis OP direction.

As shown in FIGS. 6A and 6B, the cam groove 12g is a through-hole formed along a direction intersecting the optical axis OP direction, at a position near the end on the image plane side of the cam cylinder 12, and the cam follower 27a of the seventh lens group unit 27 is engaged with this groove. In the cam groove 12g, the cam follower 27a of the seventh lens group unit 27 is located at the right end (image plane side) at the wide-angle position shown in FIG. 6A, and the cam follower 27a of the seventh lens group unit 27 is located at the left end (the subject side) at the telephoto position shown in FIG. 6B.

Consequently, when the cam cylinder 12 is rotated with respect to the rectilinear cylinder 11, the cam follower 27a of the seventh lens group unit 27 moves along the cam groove 12g while engaging with the rectilinear groove 11e of the rectilinear cylinder 11, which allows the group unit 27 to be moved back and forth in the optical axis OP direction.

As shown in FIGS. 6A and 6B, the zoom drive pin 33 is already attached to the outer peripheral surface of the cam cylinder 12. However, in the actual assembly process, the zoom drive pin 33 is inserted through the pin insertion hole 32b (discussed below) and fixed to the outer peripheral surface of the cam cylinder 12 in a state in which the base frame 40 and the zoom ring 32 are assembled on the outer peripheral surface side of the cam cylinder 12.

Assembly of Lens Barrel 100

The assembly process of the lens barrel 100 including the lens support mechanism 10 of this embodiment will now be described with reference to FIGS. 9A to 12B.

That is, as described above, the rectilinear cylinder 11 and the cam cylinder 12 are such that the cam cylinder 12 disposed on the outer peripheral surface side of the rectilinear cylinder 11, and are fitted together in the radial direction of a circle whose center is the optical axis OP.

First, the main cam follower 11b of the rectilinear cylinder 11 is fixed with a screw (not shown) from the outside in the radial direction to the outer peripheral surface of the rectilinear cylinder 11, as shown in FIG. 6A, in a state in which the cam cylinder 12 has been inserted on the outer peripheral surface side of the rectilinear cylinder 11.

Similarly, the cam followers 23a, 24a, and 27a of the third, fourth, and seventh lens group units 23, 24, and 27 are fixed with screws (not shown) to the main bodies and so forth of the third, fourth, and seventh lens group units 23, 24, and 27 in a state in which the cam cylinder 12 has been inserted on the outer peripheral surface side of the rectilinear cylinder 11.

At this point, when the cam cylinder 12 is rotated with respect to the rectilinear cylinder 11, rotation of the first, third, fourth, and seventh lens group units 21, 23, 24, and 27 is restricted by the rectilinear grooves 11d and 11e, so these units move along the path of the cam grooves 12d, 12e, 12f, and 12g in the optical axis OP direction.

The cam cylinder 12 itself also moves in the optical axis OP direction while rotating along the path of the main cam grooves 12b with which the main cam followers 11b on the rectilinear cylinder 11 side are engaged.

Thus, because of a configuration shown in FIGS. 6A and 6B in which the cam cylinder 12 is deployed with respect to the rectilinear cylinder 11, the total amount of movement of the first and the third to seventh units 21 to 27 coincides with the combined value of the length of the path of the cam grooves 12d, 12e, 12f, and 12g in the optical axis OP direction, plus the length of the path of the main cam grooves 12b in the optical axis OP direction.

Figure 9A:
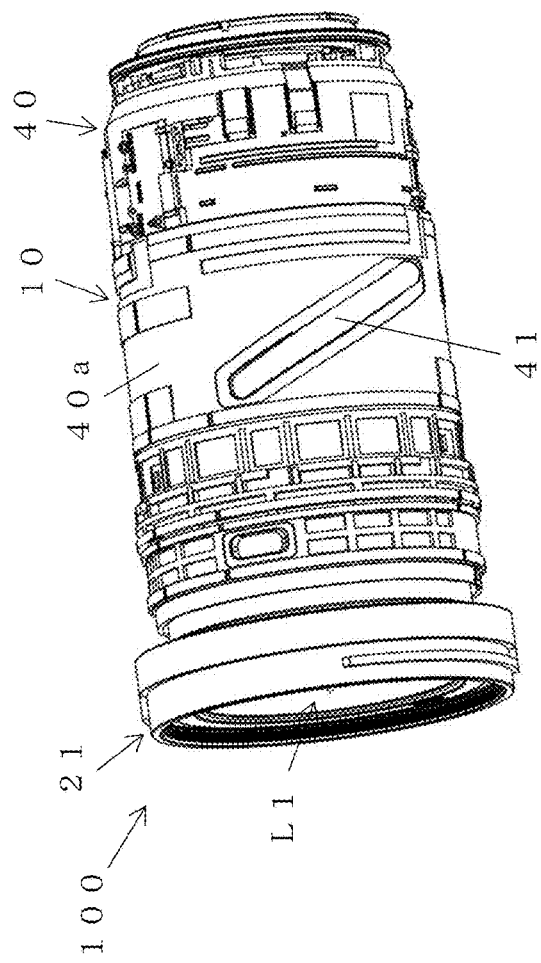
FIG. 9A is an oblique view showing a configuration in which a first lens group unit and a base frame are disposed on the outer peripheral surface side of the lens support mechanism in FIG. 6A.

Next, the rectilinear cylinder 11 and the cam cylinder 12 are inserted into the base frame 40 as shown in FIG. 9A in a state in which the first to seventh lens group units 21 to 27 have been assembled, and the rectilinear cylinder 11 is fixed to the base frame 40 with a screw (not shown).

Figure 9B:
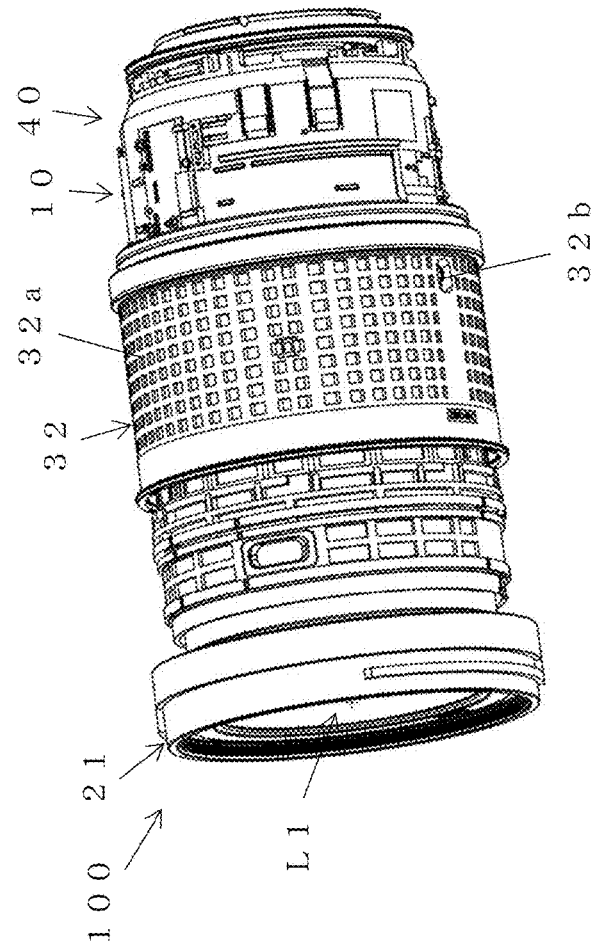
FIG. 9B is an oblique view showing a configuration in which a zoom ring is disposed on the outer peripheral surface side of the configuration in FIG. 9A.

Next, as shown in FIG. 9B, the substantially cylindrical zoom ring 32 is attached to the outer peripheral surface side of the main body portion 40a of the substantially cylindrical base frame 40.

Figure 10:
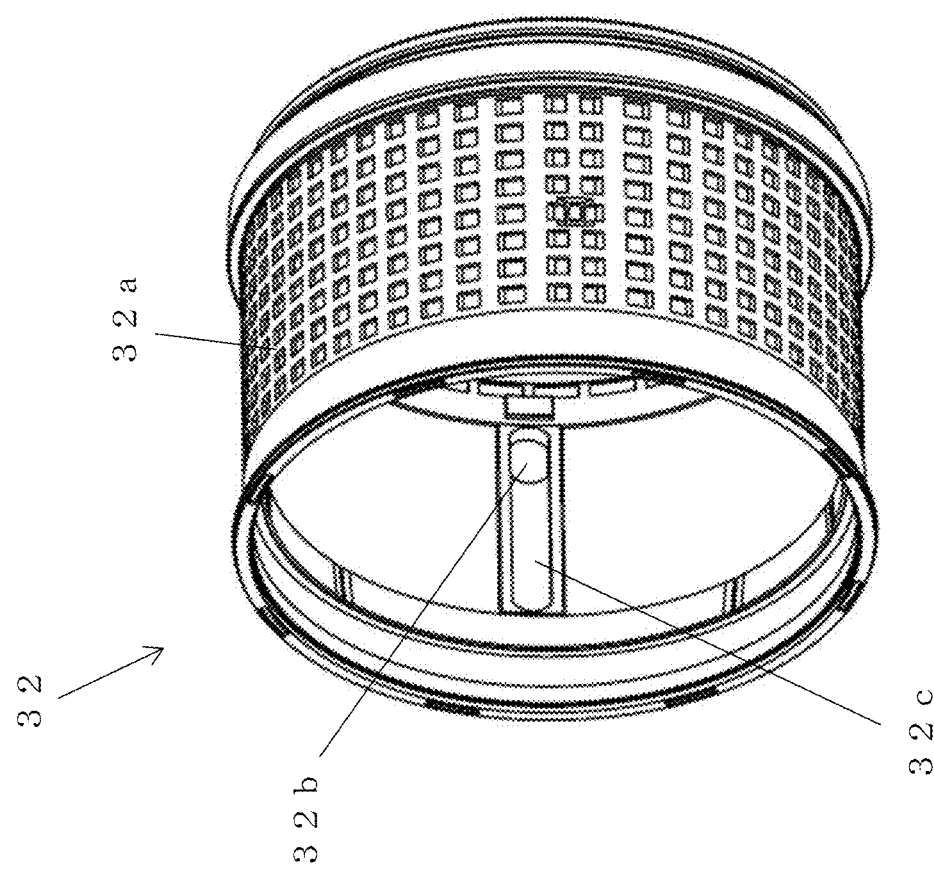
FIG. 10 is an oblique view showing the configuration of the zoom ring in FIG. 9B.

As shown in FIG. 10, the zoom ring 32 has a substantially cylindrical main body portion 32a, a pin insertion hole 32b, and a rectilinear restricting groove 32c.

The pin insertion hole 32b is a through-hole formed in the main body portion 32a, and the zoom drive pin 33 is inserted when the zoom drive pin 33 is attached to the outer peripheral surface of the cam cylinder 12.

The rectilinear restricting groove 32c is formed along the optical axis OP direction to allow the engaged movement of the head of the zoom drive pin 33 that is inserted through the pin insertion hole 32b and is attached to the outer peripheral surface of the cam cylinder 12 via a pin escape hole 41 (see FIG. 9A) of the base frame 40.

Figure 11:
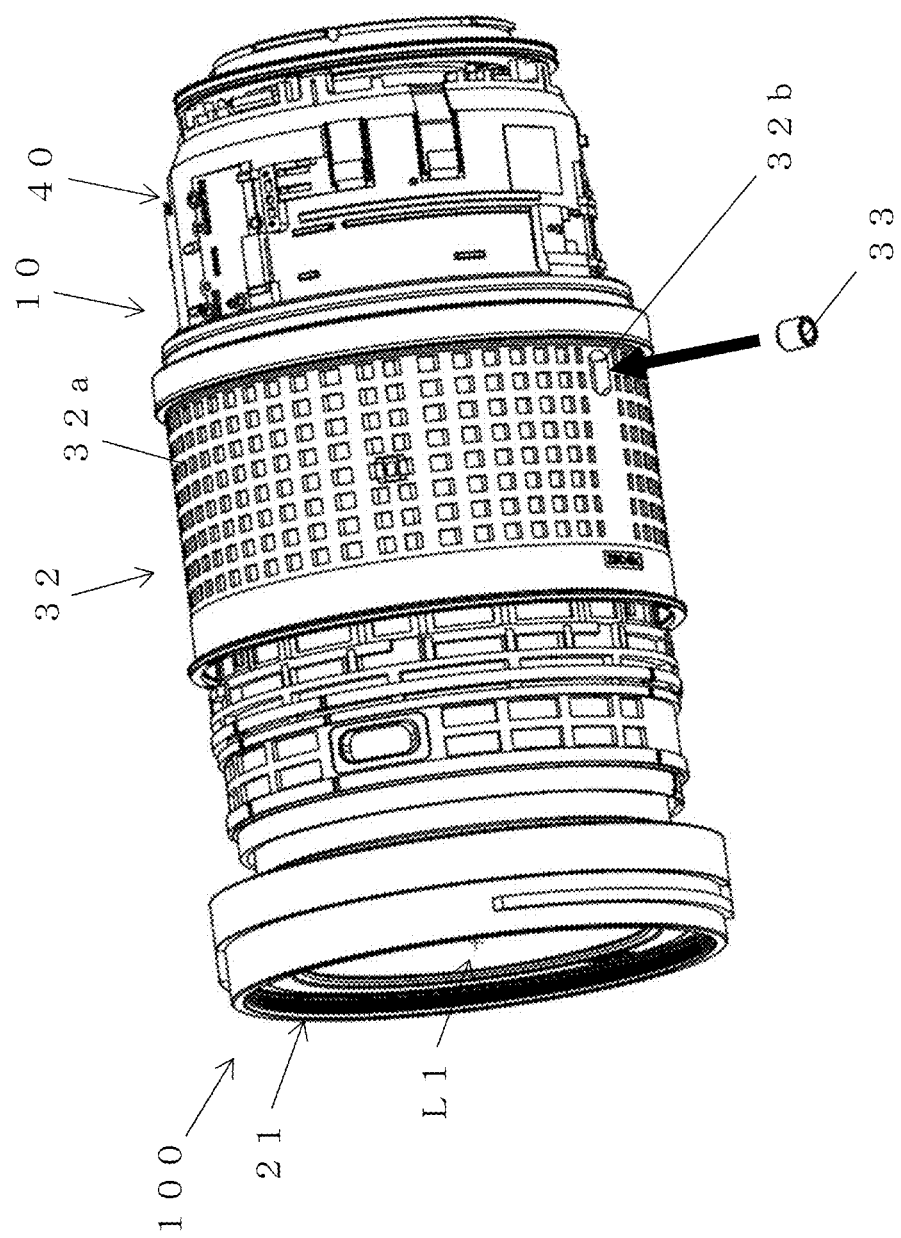
FIG. 11 is an oblique view showing the step of attaching a zoom drive pin to the zoom ring in FIG. 10 from the outer peripheral surface side thereof.

As shown in FIG. 11, the zoom drive pin 33 is inserted from the outer peripheral surface side through the pin insertion hole 32b of the zoom ring 32 and the pin relief hole 41 (see FIG. 9A) of the base frame 40. Then, the zoom drive pin 33 is fixed to the outer peripheral surface of the cam cylinder 12 with a screw (not shown) from the outer peripheral surface side.

Figure 12A:
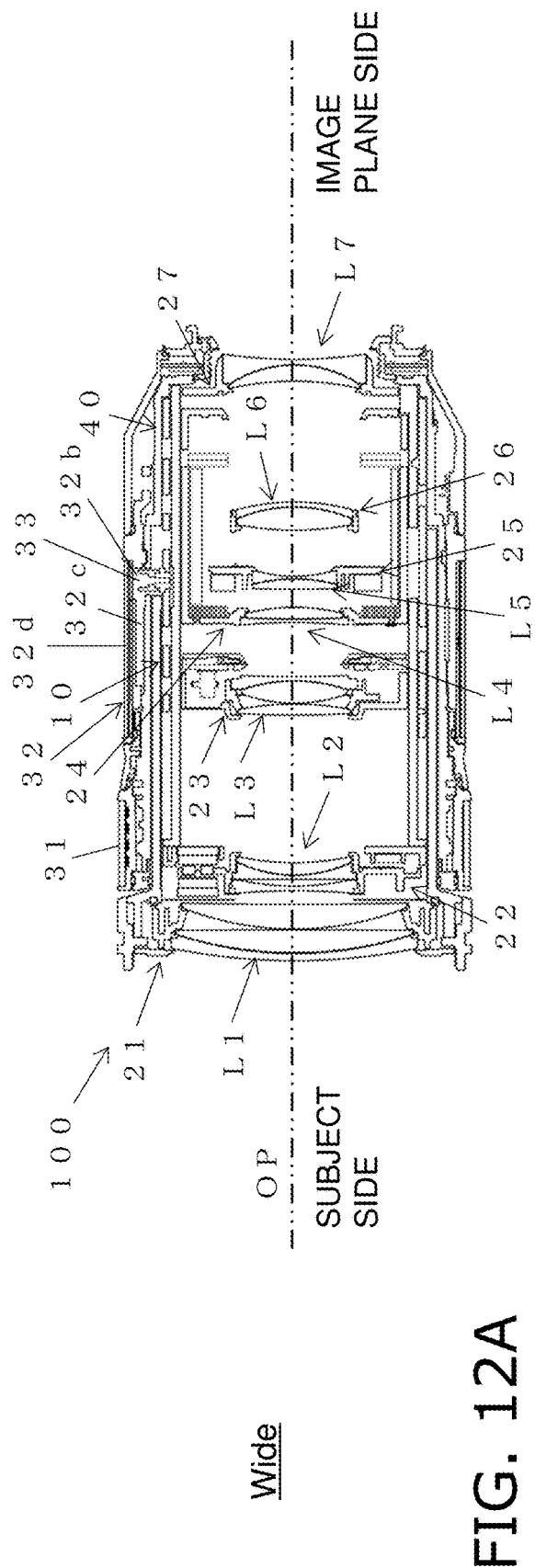
FIG. 12A is a cross-sectional view showing a configuration in which the zoom drive pin in FIG. 11 is fixed to the cam cylinder and moved to the wide-angle position.
Figure 12B:
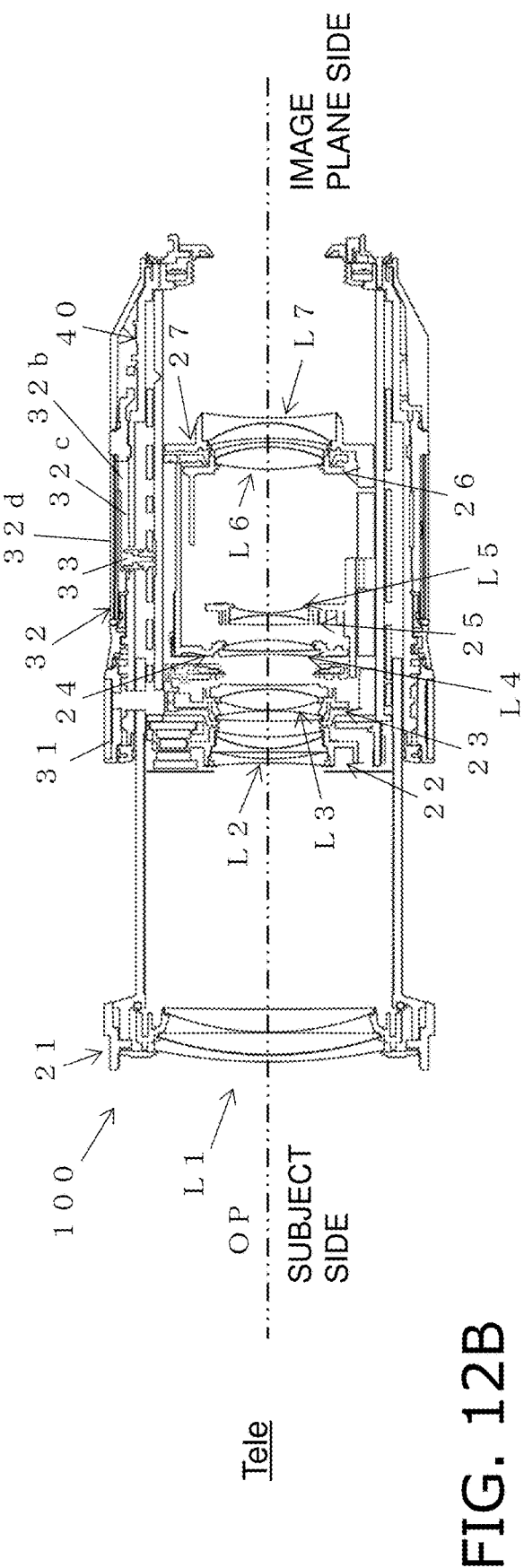
FIG. 12B is a cross-sectional view showing a configuration in which the zoom drive pin in FIG. 11 is fixed to the cam cylinder and moved to the telephoto position.

At this point, as shown in FIGS. 12A and 12B, the head of the zoom drive pin 33 engages with the rectilinear restricting groove 32c and is supported so as to be movable in the optical axis OP direction with respect to the zoom ring 32.

Here, when the zoom ring 32 is rotated, the cam cylinder 12 is rotationally driven by a rotational force applied in the circumferential direction to the zoom drive pin 33 engaged with the zoom ring 32.

The cam cylinder 12 then moves in the optical axis OP direction while rotating as a result of movement of the main cam follower 11b provided on the rectilinear cylinder 11 side along the main cam grooves 12b.

At this point, the zoom drive pin 33 slides in the optical axis OP direction while engaged with the rectilinear restricting groove 32c.

After the zoom drive pin 33 is fixed to the outer peripheral surface of the cam cylinder 12 with a screw, a rubber zoom ring cover 32d is attached to the outer peripheral surface of the zoom ring 32 as shown in FIGS. 12A and 12B.

This closes off the pin insertion hole 32b so that the zoom drive pin 33 cannot be seen from the outside.

Main Features

The lens support mechanism 10 in this embodiment comprises the first to seventh lens group units 21 to 27, the substantially cylindrical rectilinear cylinder 11, and the substantially cylindrical cam cylinder 12. The rectilinear cylinder 11 includes the first to seventh lens group units 21 to 27, and has the main cam follower 11b protruding outward in the radial direction from the outer peripheral surface, and the sub cam groove 11c. The cam cylinder 12 has the main cam grooves 12b and the sub cam follower 12c, and is disposed on the outer peripheral side of the rectilinear cylinder 11. The main cam grooves 12b engage with the main cam followers 11b and are formed substantially parallel to the sub cam groove 11c, and when rotated relative to the rectilinear cylinder 11, move the lens group units 21 to 27 back and forth in the optical axis direction. The sub cam follower 12c projects inward in the radial direction and engages with the sub cam groove 11c.

That is, with the lens support mechanism 10 in this embodiment, the rectilinear cylinder 11 is provided with the main cam followers 11b and the sub cam groove 11c, and the cam cylinder 12 is provided with the main cam grooves 12b and the sub cam follower 12c.

Consequently, since the main cam groove 12b and the sub cam groove 11c are each provided to a separate frame (the rectilinear cylinder 11 and the cam cylinder 12), a decrease in the strength of the frame can be avoided as compared to a configuration in which the main cam groove 12b and the sub cam groove 11c are provided to the same frame. Furthermore, there is more latitude in the layout of the grooves with respect to the rectilinear cylinder 11 and the cam cylinder 12, and more latitude in designing the paths of movement. This affords a lens barrel 100 that is compact and offers high performance.

Also, as described above, since the main cam groove 12b and the sub cam groove 11c are provided to the separate frames, the main cam groove 12b and the sub cam groove 11c can be disposed at positions that overlap each other when viewed from the outer peripheral surface side, as shown in FIG. 6A. Such a layout would not be feasible with a configuration in which the main cam grooves 12b and the sub cam groove 11c are provided to the same part. Consequently, there is greater latitude in the layout of the grooves and in the designing the paths of movement, and a compact and high-performance lens barrel 100 can be obtained.

Furthermore, if an impact should be applied from the outside, such as when the lens barrel 100 is accidentally dropped, the frames and the cam followers will undergo elastic deformation. At this point, the sub cam follower 12c and the sub cam groove 11c that are engaged with each other come into contact with each other and receive the impact, so that the impact force is dispersed, and this improves the impact resistance of the lens barrel 100.

Because of all this, employing a configuration as in this embodiment will afford greater latitude in the layout of the grooves formed in the rectilinear cylinder 11 and the cam cylinder 12, and a lens barrel 100 that is both smaller and more impact resistant can be obtained.

Other Embodiments

An embodiment of the present disclosure was described above, but the present disclosure is not limited to or by the above embodiment, and various changes can be made without departing from the gist of the disclosure.

(A)

In the above embodiment, as shown in FIG. 8, an example was given in which, in a steady state, the sub cam follower 12c provided on the cam cylinder 12 side and the sub cam groove 11c provided on the rectilinear cylinder 11 side are engaged with each other with a specific gap G1 therebetween. However, the present disclosure is not limited to this.

For example, the configuration may be such that in a steady state, a part of the sub cam follower (second cam followers) is engaged in a state of being in contact with a part of the sub cam groove (second cam groove). That is, in the present disclosure, it is not essential that the sub cam follower and the sub cam groove are completely out of contact in a steady state, and parts of them may be in contact with each other.

(B)

In the above embodiment, an example was given in which, in order to improve the impact resistance of the lens barrel 100, one sub cam groove 11c and one sub cam follower 12c engaged therewith were provided to the rectilinear cylinder 11 and the cam cylinder 12, respectively. However, the present disclosure is not limited to this.

For example, the configuration may be such that two or more combinations of a sub cam follower and a sub cam groove are provided in order to improve the impact resistance of the lens barrel.

(C)

In the above embodiment, an example was given in which the cam cylinder 12 disposed on the outer peripheral side of the fixedly disposed rectilinear cylinder 11 was driven back and forth in the optical axis OP direction. However, the present disclosure is not limited to this.

For example, the configuration may be such that the rectilinear cylinder is driven back and forth in the optical axis direction relative to the cam cylinder.

(D)

In the above embodiment, an example was given in which the sub cam groove 11c provided to the rectilinear cylinder 11 in order to improve the impact resistance of the lens barrel 100 was provided as a non-through recess provided to the outer peripheral surface of the rectilinear cylinder 11. However, the present disclosure is not limited to this.

For example, the sub cam groove (second cam groove) provided to the rectilinear cylinder (fixed cylinder) may be a through-hole that allows the outer peripheral surface and the inner peripheral surface of the rectilinear cylinder to communicate with each other.

However, in terms of minimizing the decrease in rigidity of the rectilinear cylinder that happens when the sub cam groove (second cam groove) is provided, the sub cam groove (second cam groove) preferably does not go all the way through, as in the above embodiment.

(E)

In the above embodiment, an example was given in which the insertion opening 11ca was provided to the end surface on the image plane side of the sub cam groove 11c in order to insert the cam cylinder 12 from the end surface on the image plane side of the rectilinear cylinder 11 in a state in which the sub cam follower 12c has been attached to the inner peripheral surface side of the cam cylinder 12. However, the present disclosure is not limited to this.

For example, the position where the insertion opening is provided is not limited to the end face on the image plane side of the sub cam groove (second cam groove), and may instead be the end face on the subject side.

(F)

In the above embodiment, an example was given in which the sub cam follower 12c provided to the cam cylinder 12 in order to improve the impact resistance of the lens barrel 100 had a substantially conical shape and had a flange portion. However, the present disclosure is not limited to this.

For example, the sub cam follower (second cam follower) may have no flange portion.

Also, the shape is not limited to a substantially conical shape, and the sub cam follower (second cam follower) may instead have a substantially columnar shape, for example.

(G)

In the above embodiment, an example was given in which the present disclosure was applied to the lens barrel 100 that could be removably attached to the camera body 101. However, the present disclosure is not limited to this.

For example, the present disclosure may be applied not to a detachable lens barrel, but to a lens barrel that is integrated with a camera body and is not removable.

INDUSTRIAL APPLICABILITY

Since the lens support mechanism of the present disclosure has the effect of affording greater latitude in design than in the past, it can be widely applied to a lens barrel or the like that includes a lens support mechanism.

The invention claimed is:

1. A lens support mechanism, comprising:
a lens group unit;
a cylindrical fixed cylinder that envelops the lens group unit and has a first cam follower protruding radially outward from an outer peripheral surface, and a second cam groove; and
a cylindrical cam cylinder that has a first cam groove that engages with the first cam follower and is formed parallel to the second cam groove and that moves the lens group unit back and forth in an optical axis direction when rotated relative to the fixed cylinder, and a second cam follower that protrudes inward in a radial direction and engages with the second cam groove, the cam cylinder being disposed on an outer peripheral side of the fixed cylinder, and
wherein when the first cam follower engages with the first cam groove and slides, the second cam follower engages with the second cam groove in a non-contact state, and the first cam groove provided as through-holes formed with the cam cylinder, and the second cam groove does not go through the fixed cylinder.

2. The lens support mechanism according to claim 1, wherein in the cam cylinder, the first cam follower provided to the fixed cylinder moves along the first cam groove, causing the cam cylinder to move in the optical axis direction of the lens group unit while rotating relative to the fixed cylinder.

3. The lens support mechanism according to claim 1, wherein the second cam groove is formed up to a front end face or a rear end face of the fixed cylinder in the optical axis direction, and has an insertion opening on an end face into which the second cam follower is inserted during assembly.

4. The lens support mechanism according to claim 1, wherein the second cam follower has an annular flange portion formed substantially parallel to the outer peripheral surface of the fixed cylinder in a cross-sectional view along the optical axis direction.

5. The lens support mechanism according to claim 1, wherein the second cam follower has a conical shape.

6. A lens barrel, comprising the lens support mechanism according to claim 1.

7. A camera, comprising:
the lens barrel according to claim 6; and
a camera body to which the lens barrel is attached.

8. A lens support mechanism, comprising:
a lens group unit;
a cylindrical fixed cylinder that envelops the lens group unit and has a first cam follower protruding radially outward from an outer peripheral surface, and a second cam groove; and
a cylindrical cam cylinder that has a first cam groove that engages with the first cam follower and is formed parallel to the second cam groove and that moves the lens group unit back and forth in an optical axis direction when rotated relative to the fixed cylinder, and a second cam follower that protrudes inward in a radial direction and engages with the second cam groove, the cam cylinder being disposed on an outer peripheral side of the fixed cylinder, and
wherein the first cam groove is provided as through-holes formed with the cam cylinder, and
the second cam groove does not go through the fixed cylinder.

9. A lens support mechanism, comprising:
a lens group unit;
a cylindrical fixed cylinder that envelops the lens group unit and has a first cam follower protruding radially outward from an outer peripheral surface, and a second cam groove; and
a cylindrical cam cylinder that has a first cam groove that engages with the first cam follower and is formed parallel to the second cam groove and that moves the lens group unit back and forth in an optical axis direction when rotated relative to the fixed cylinder, and a second cam follower that protrudes inward in a radial direction and engages with the second cam groove, the cam cylinder being disposed on an outer peripheral side of the fixed cylinder, and
wherein the first cam groove and the second cam groove are disposed so as to overlap partially when viewed in a direction perpendicular to the optical axis direction, and the first cam groove provided as through-holes formed with the cam cylinder, and the second cam groove does not go through the fixed cylinder.

* * * * *